Sept. 27, 1927.
J. M. THORP
1,643,476
MULTIWHEEL PROPELLING MECHANISM FOR MOTOR VEHICLES
Filed Aug. 7, 1924
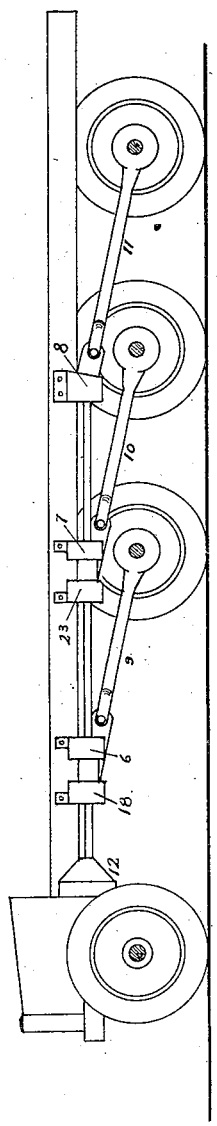
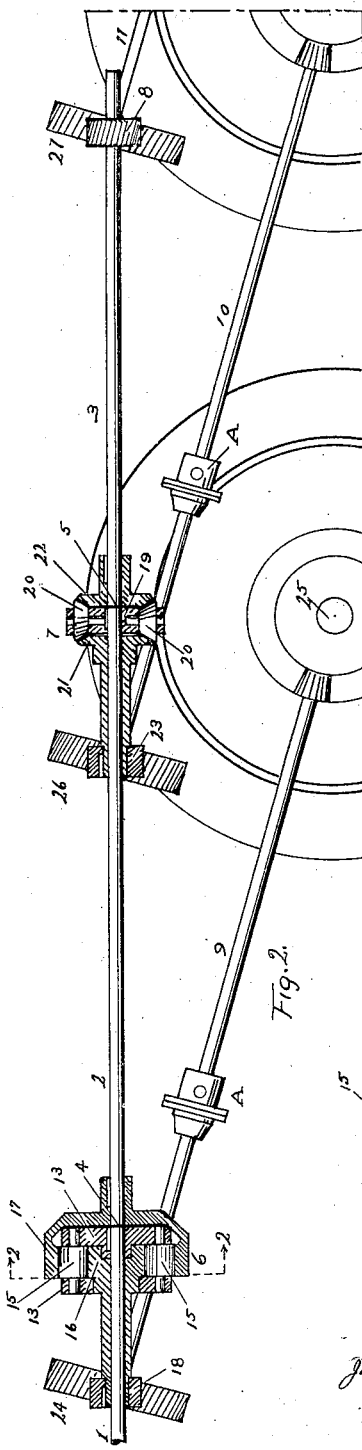
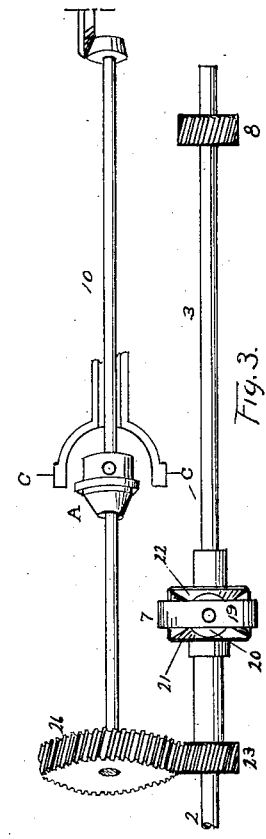
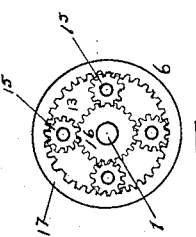
INVENTOR:
James Madison Thorp.

Patented Sept. 27, 1927.

1,643,476

UNITED STATES PATENT OFFICE.

JAMES MADISON THORP, OF ALAMEDA, CALIFORNIA.

MULTIWHEEL-PROPELLING MECHANISM FOR MOTOR VEHICLES.

Application filed August 7, 1924. Serial No. 730,694.

The function of the present invention is similar to that disclosed in Letters Patent issued to me Oct. 16, 1923, No. 1,471,295 which operates through worm gearing with the drive shaft subject to vertical movement as the wheels ride over uneven surfaces; while the one described below maintains the drive shaft in a straight line, the worm drive being omitted and double reduction gears substituted.

Other advantages are the spur gearing in the two-to-one differential and the straight line final drive shaft at load position.

Figure 1 of the drawings is a sectional elevation through a motor vehicle embodying my invention, showing the housings only of the mechanism; Fig. 2 an enlarged sectional elevation in detail, through the line shaft and final drive shafts; Fig. 3 a top view of one unit of the drive; and Fig. 4 a cross section through 2 2 of the two-to-one differential.

Similar characters of reference denote similar parts throughout the several views.

In the detail drawings shaft and gear bearings are omitted as they tend to obstruct the view of important parts, its is understood however, that such omission can be readily supplied by those expert in the art.

Referring to the drawings, the line shaft is composed of three sections, 1 2 and 3 coaxially abutting at 4 and 5; upon the shaft 1 is mounted the two-to-one differential 6, shaft 2 carries the one-to-one differential 7 and shaft 3 the pinion 8; each of these units operates a final drive shaft 9 10 and 11 respectively.

I will now describe the invention as shown in the drawings, it being understood that, although I describe a mechanism for propelling three axles, the addition of one unit, as hereinafter described, will fit the line shaft for driving four axles, or by omitting one unit, two axles may be driven.

In this arrangement I employ helical pinions and gears to deliver power from the line shaft to each of the driven units, and incline the final drive shafts so that at full load the shafts broken by the universal joint A will line up and in general relieve the universal knuckle from unnecessary movement.

Shaft 1 is keyed to the spider 13 upon which is mounted the planet pinions 15, these pinions mesh with the sleeve-gear 16 on the inner side and with the internal gear 17 on the outer side, the sleeve of the gear 16 is keyed to a driving pinion 18, the shaft 2 is fixed to the gear 17 at one end and at the other to a second spider 19 upon which is mounted the planet pinions 20 which are meshed with a second sleeve-gear 21 and a similar gear 22 to which the shaft 3 is fixed; the sleeve of gear 21 is keyed to the pinion 23 and the shaft 3 to the pinion 8.

The final drive shafts are made flexible by means of the universal joints A, and the housings of these shafts act as torque arms and are pivoted at C in the usual manner.

In operation: Power from the motor 12 revolves the shaft 1 and the spider 13, the pinions 15, not turning on their axis, but being meshed with the gears 16 and 17 will rotate them both at the same speed as the spider, one-third of the power from the line shaft being transmitted through the sleeve to the pinion 18 and to the gear 24 and to the final drive shaft 9 then through the usual gears and axle differential to the axle 25.

The gear 17 will deliver two-thirds of the power to the shaft 2 which rotates the spider 19, and the pinions 20 not turning on their axis carry another third of the power through the sleeve and its gear to the pinion 23, gear 26 and final drive shaft 10 to the next axle in the series. The gear 22 operating the shaft 3 and pinion 8 and gear 27 delivers the remaining third of the power to the third axle.

It is obvious, to one skilled in the art, that the function of the gears in a differential is not to transmit power through their rotation but to strike a balance between driven members.

In the case now under consideration we have to balance the driving power of the motor so as to divide it equally between three axles.

Special attention is called to the gear ratios in the differential 6, the sleeve-gear 16 being half the diameter of gear 17, thus traction or inertia of the wheels operated from axle 25 will have a double purchase through the smaller gear and will hold or balance the combined inertia or tractive force of the other four wheels. Thus in like manner but with a ratio of one to one the differential 7 will balance or divide the stresses between the other two axles.

As mentioned above, four axles may be driven by adding another unit between the differential 6 and the motor, the arrangement of parts being similar but with a gear ratio in the differential of three to one. Likewise by omitting unit 6 and applying the power to shaft 2 the differential 7 will balance the stresses of the two axles driven from the pinions 23 and 8.

I am aware that numerous methods of gearing have been employed in the construction of compensating mechanism to balance the speed and stresses between two wheels, in such cases however, the power is delivered to the spider through a gear fixed to the periphery of the spider, such methods are not adapted to concentric line shaft operation.

The differential 7 of the drawing is a well known form as to bevel gears and planet pinions but entirely different as to application of power and function thereof. I therefore reserve the rights to all such variations and alterations as fall within the scope of my invention and the terms of the following claims:

I claim:

1. A multi-way differential, comprising a line shaft divided into a number of co-axially mounted sections, spiders fixed to some of the shaft sections, sleeves mounted on the shafts adjacent to the spiders, gears upon the sleeves and upon the shafts, planet pinions mounted on the spiders and in meshing contact with gears upon the sleeves and shafts, the diameter ratio of the sleeve gears to that of the shaft gears varying with the number of axle units to be driven so as to balance the stresses between the several axles.

2. In multi-way differentials, a line shaft of two or more co-axially mounted sections, a spider fixed to each shaft section but one, a sleeve mounted on the shaft sections adjacent to each spider, planet pinions on the spiders, gears of varying ratios on the shafts and sleeves and in meshing engagement with the planet pinions.

3. A multi-wheel line-shaft differential, comprising a drive shaft, a planet gear spider fixed to the rear end of said drive shaft, a sleeve having a small gear rotatably mounted upon said drive shaft adjacent to said spider, a driven shaft mounted concentric with the drive shaft, an internal gear of greater diameter than the small gear fixed to said driven shaft and cupping over said spider, planet pinions pivotally mounted upon the spider between and meshing with both the small gear and the internal gear, and a driving gear upon the forward end of the sleeve, for the purpose specified.

4. A multi-wheel propelling mechanism, comprising a line shaft of two or more co-axially mounted sections, sleeves, spiders and gears mounted upon the shaft sections in compensating arrangement as described, helical toothed pinions on the sleeves and on one of the shaft sections, helical toothed gears fixed to shafts, that are inclined to the axis of said line shaft, and meshing with said helical toothed pinions, the inclined shafts being adapted to connect with and drive a series of vehicle axles.

JAMES MADISON THORP.